(12) United States Patent
Wang et al.

(10) Patent No.: US 9,026,262 B2
(45) Date of Patent: May 5, 2015

(54) METHOD, CIRCUIT, AND ELECTRONIC DEVICE FOR CONTROLLING ROTATION SPEED OF FAN

(75) Inventors: Chun-Chi Wang, Taipei (TW); Wei-Chung Hsiao, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 420 days.

(21) Appl. No.: 13/542,513

(22) Filed: Jul. 5, 2012

(65) Prior Publication Data

US 2013/0100606 A1 Apr. 25, 2013

Related U.S. Application Data

(60) Provisional application No. 61/550,301, filed on Oct. 21, 2011.

(30) Foreign Application Priority Data

Jan. 13, 2012 (CN) .......................... 2012 1 0009301

(51) Int. Cl.
G05D 23/00 (2006.01)
F04D 27/00 (2006.01)
G06F 1/20 (2006.01)
H02P 27/08 (2006.01)

(52) U.S. Cl.
CPC .............. F04D 27/004 (2013.01); G06F 1/206 (2013.01); H02P 27/08 (2013.01)

(58) Field of Classification Search
CPC .......................... G06F 1/206; H06K 7/20209
USPC ..................... 700/299; 361/679.48
See application file for complete search history.

(56) References Cited

U.S. PATENT DOCUMENTS 8,489,250 B2 * 7/2013 Aklilu et al. .................. 700/300

FOREIGN PATENT DOCUMENTS

| CN | 102102679 A | 6/2011 |
|---|---|---|
| TW | 200407506 | 5/2004 |
| TW | 200608178 | 3/2006 |
| TW | 1327267 | 7/2010 |

* cited by examiner

Primary Examiner — Mohammad Ali
Assistant Examiner — Sheela S Rao

(57) ABSTRACT

The disclosure relates to a method, circuit, and electronic device for controlling a rotation speed of a fan. The method provides a multistage function curve associates temperatures with rotation speed values. The multistage function curve comprises a first steady-state function segment with slope of zero, a second steady-state function segment with slope of zero and N function segments positioned between the first and second steady-state function segments. N is a positive integer. The slope of a $(i+1)_{th}$ function segment is greater than that of an $i_{th}$ function segment, and i is a positive integer in the range from 1 to N. The electronic device comprising the circuit may use the temperature of the processor based on the multistage function curve to dynamically control the rotation speed.

17 Claims, 3 Drawing Sheets

METHOD, CIRCUIT, AND ELECTRONIC DEVICE FOR CONTROLLING ROTATION SPEED OF FAN

BACKGROUND

1. Technical Field

The disclosure relates to a control circuit, and more particularly to a method, circuit, and electronic device for controlling rotation speed of fan based on a multistage function curve.

2. Related Art

With the increase of the operation frequency of a processor, the power consumption and temperature of the processor are increasing correspondingly. This results in the increase of the temperature of a computer host. Generally, when the surface temperature of a processor reaches 60° C., it should be noted if the temperature of the processor is rapidly rising. In order to decrease the temperature of the processor, fans are often used to dissipate heat of the processor. The rising rate of the rotation speed of a fan is in positive correlation with the temperature rising rate of the processor.

Since the temperature of the processor shows positive correlation with computation amount of the processor, the temperature of the processor may rise suddenly and rapidly due to the sudden increase of the computation amount. When the rotation speed of the fan rises to a maximum value from a preset rotation speed in a very short time period, decibels (dBs) of noise generated by the fan rise a lot rapidly and the noise could bother users.

SUMMARY

The present disclosure provides a method for dynamically controlling the fan to dissipate heat of a processor and adjusting fan noise. A multistage function curve is predefined, associates temperatures with rotation speed values and is established based on the fan noise. A temperature of the processor is detected. One of the rotation speed values is obtained by looking up the multistage function curve according to the detected temperature. A rotation speed of the fan is adjusted based on the obtained rotation speed value.

The multistage function curve comprises a first steady-state function segment, a second steady-state function segment, and N function segments. The N function segments are positioned between the first steady-state function segment and the second steady-state function segment, and N is a positive integer. Slopes of the first steady-state function segment and the second steady-state function segment are both zero. A slope of $(i+1)_{th}$ function segment is greater than that of an $i_{th}$ function segment, and i is a positive integer in a range from 1 to N. The $(i+1)_{th}$ function segment is linked to the $i_{th}$ function segment, and the $(i+1)_{th}$ function segment is closer to the second steady-state function segment as compared with the $i_{th}$ function segment.

The disclosure further provides a circuit for dynamically controlling a fan to dissipate heat of a processor and adjusting fan noise. The circuit comprises a temperature detection means and a controller. The temperature detection means detects a temperature of the processor, and the controller obtains one of rotation speed values by looking up a multistage function curve according to the detected temperature and controls a rotation speed of the fan according to the obtained rotation speed value.

The multistage function curve is established based on noise values, associates temperatures with the rotation speed values and comprises a first steady-state function segment, a second steady-state function segment, and N function segments. The N function segments are positioned between the first steady-state function segment and the second steady-state function segment, and N is a positive integer. Slopes of the first steady-state function segment and the second steady-state function segment are both zero. A slope of $(i+1)_{th}$ function segment is greater than that of an $i_{th}$ function segment, and i is a positive integer in a range from 1 to N. The $(i+1)_{th}$ function segment is linked to the $i_{th}$ function segment, and the $(i+1)_{th}$ function segment is closer to the second steady-state function segment as compared with the $i_{th}$ function segment.

The disclosure further provides an electronic device comprising a processor, a fan, a temperature detection means and a controller. The fan dissipates heat of the processor. The temperature detection means detects a temperature of the processor. A controller obtains one of rotation speed values by looking up a multistage function curve according to the detected temperature and controls a rotation speed of the fan according to the obtained rotation speed value.

The multistage function curve is established based on noise values, associates temperatures with the rotation speed values and comprises a first steady-state function segment, a second steady-state function segment, and N function segments. The N function segments are positioned between the first steady-state function segment and the second steady-state function segment, and N is a positive integer. Slopes of the first steady-state function segment and the second steady-state function segment are both zero. A slope of $(i+1)_{th}$ function segment is greater than that of an ith function segment, and i is a positive integer in the range from 1 to N. The $(i+1)_{th}$ function segment is linked to the $i_{th}$ function segment, and the $(i+1)_{th}$ function segment is closer to the second steady-state function segment as compared with the $i_{th}$ function segment.

For purposes of summarizing, some aspects, advantages and features of some embodiments of the disclosure have been described in this summary. Not necessarily all of (or any of) these summarized aspects, advantages or features will be embodied in any particular embodiment of the disclosure. Some of these summarized aspects, advantages and features and other aspects, advantages and features may become more fully apparent from the following detailed description and the appended claims.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

The disclosure may be applied to an electronic device having a fan for heat dissipation. The electronic device may be but is not limited to a computer host or a portable computer.

Figure 1:
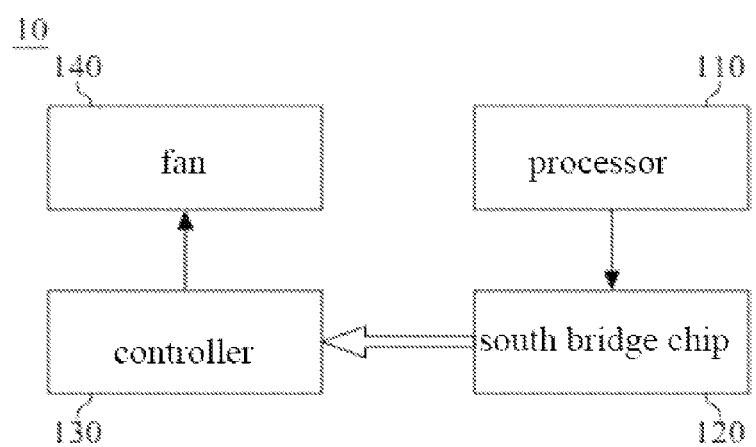
FIG. 1 is an architecture diagram for a control circuit according to an embodiment of the disclosure.

FIG. 1 is an architecture diagram for a control circuit according to an embodiment of the disclosure. The control circuit 10 is disposed in the electronic device and includes a processor 110, a South Bridge Chip (SBC) 120, a controller 130 and a fan 140.

In one embodiment, the SBC 120 connected to the processor 110 captures a temperature signal from the processor 110 in operation by at least one sensor disposed on the surface of the processor to obtain the current temperature of the processor 110 in real time and transmits a signal concerning the current temperature of the processor 110 to the controller 130.

In one embodiment, the temperature of the processor operating, which is an inner temperature of the processor, may be detected by a platform environment control interface (PECI) and a digital temperature sensor deposed in the processor.

In one embodiment, the temperature of the processor operating may be detected by other devices or modules.

In one embodiment, instead of the SBC 120, other control devices may capture the temperature signal from the processor 110 in operation.

The controller 130 connected to the SBC 120 provides a multistage function curve which is established based on fan noise values and associates temperatures with rotation speed values. Through the multistage function curve, the controller 130 obtains a rotation speed value according to the received signal concerning the temperature of the processor 110 and then controls the rotation speed of the fan 140 according to the rotation speed value. In an embodiment, the controller 130 may be but is not limited to a keyboard controller or other controllers for controlling the rotation speed of the fan.

Figure 2:
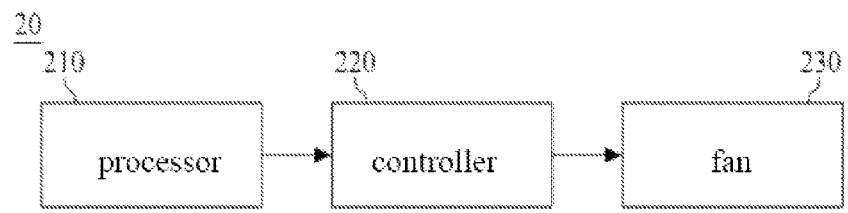
FIG. 2 is an architecture diagram for a control circuit according to another embodiment of the disclosure

FIG. 2 is an architecture diagram for a control circuit according to another embodiment of the disclosure. The control circuit 20 is implemented in the electronic device and includes a processor 210, a controller 220 and a fan 230. For example, sensors are used to detect the temperature of the processor 210 operating.

The controller 220 connected to the processor 210 captures a temperature signal from the processor 210 in operation by sensors to obtain the current temperature of the processor 210. The controller 220 obtains a rotation speed value by looking up a multistage function curve according to the received temperature signal, so that the controller 220 can control the rotation speed of the fan 230. The multistage function curve is established based on different fan noise values and associates temperatures with rotation speed values.

Figure 3:
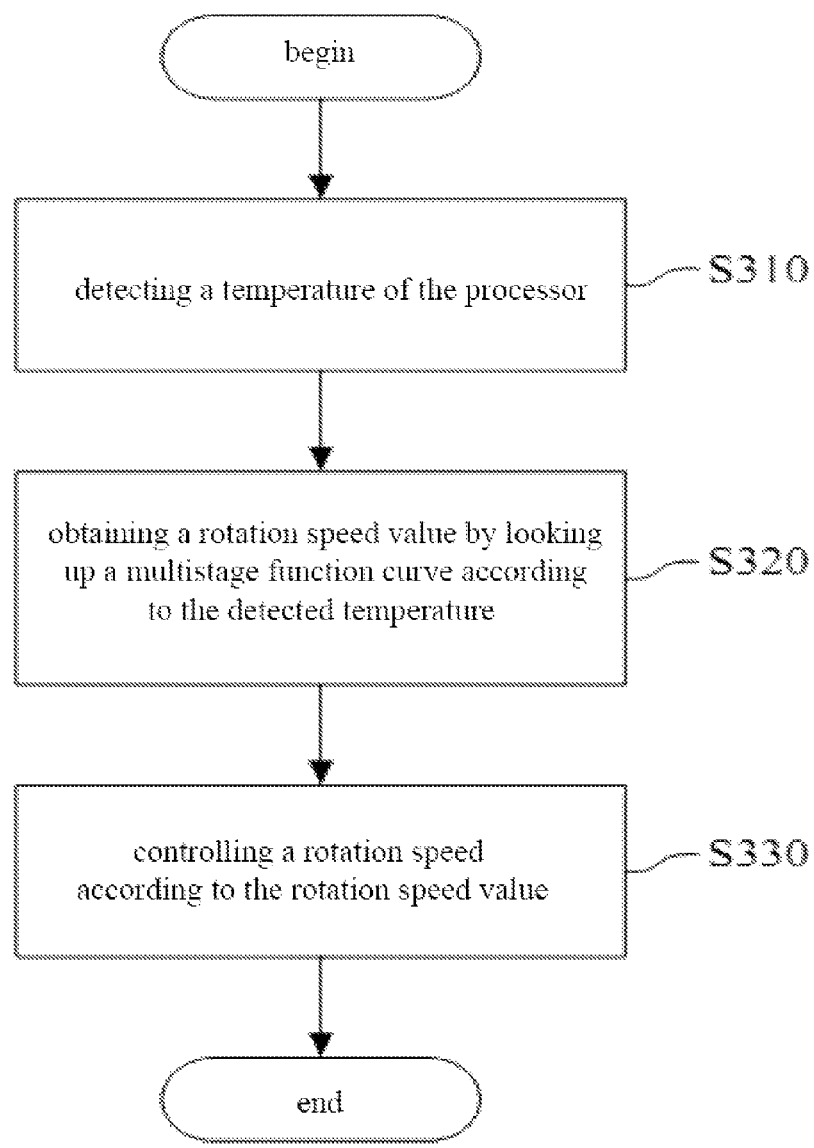
FIG. 3 is flowchart for a method for controlling a rotation speed according to the disclosure.

FIG. 3 is a flowchart for a method for controlling the rotation speed of a fan according to the disclosure. Firstly, in the step S310, a temperature of the processor operating is detected by sensors or other manners.

In step S320, after obtaining the temperature of the processor, the controller looks a rotation speed value up in the multistage function curve according to the obtained temperature.

The multistage function curve includes a first steady-state function segment, a second steady-state function segment and N (a positive integer) function segments. The N function segments are positioned between the first steady-state function segment and the second steady-state function segment. The slopes of the first steady-state function segment and the second steady-state function segment are both zero. The slope of $(i+1)_{th}$ function segment is greater than that of $i_{th}$ function segment, where i is a positive integer in the range from 1 to N. The $(i+1)_{th}$ function segment is linked to the $i_{th}$ function segment, and the $(i+1)_{th}$ function segment is closer to the second steady-state function segment than the $i_{th}$ function segment.

Figure 4:
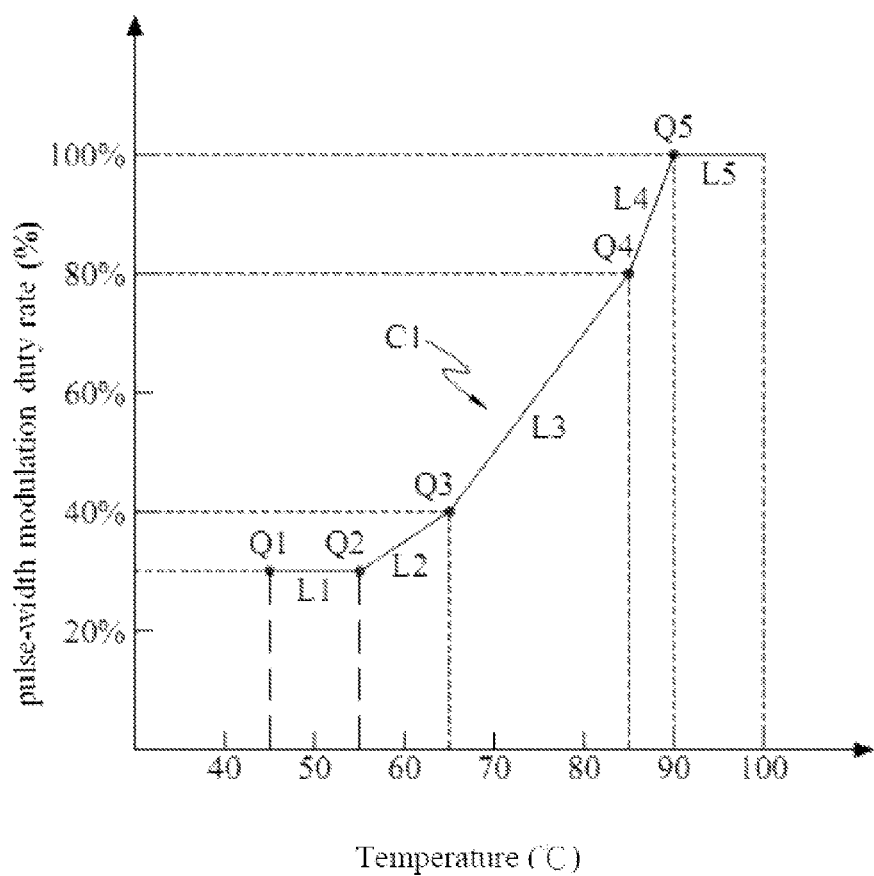
FIG. 4 is a multistage function curve associating temperatures with rotation speed values according to an embodiment of the disclosure.

In an embodiment, with reference to FIG. 4 which illustrates a multistage function curve associates temperatures with rotation speed values, N is equal to 3. The multistage function curve C1 of FIG. 4 includes the first steady-state function segment L1, multiple function segments L2~L4 and the second steady-state function segment L5. The function segments L2~L4 are positioned between the first and second steady-state function segments L1 and L5.

The first steady-state function segment L1 begins from its one end at the threshold point Q1, with its other end joining the function segment L2 at the threshold point Q2. The function segment L2 joins the function segment L3 at the threshold point Q3, the function segment L3 joins the function segment L4 at the threshold point Q4, and the function segment L4 joins the second steady-state function segment L5 at the threshold point Q5.

As described above, the slopes of the first steady-state function segment L1 and the second steady-state function segment L5 are both zero. The slope of the function segment L3 is greater than that of the function segment L2, and the slope of the function segment L4 is greater than that of the function segment L3.

In the step S330, when the obtained temperature of the processor is higher than a threshold value corresponding to the threshold point Q1, the controller obtains a pulse-width modulation (PWM) duty rate of 30% (rotation speed value) according to the obtained temperature at the threshold point Q1, whereby controlling the fan to rotate with a rotation speed corresponding to the pulse-width modulation duty rate of 30%.

Still in the step S330, when the obtained temperature of the processor is higher than a threshold value corresponding to the threshold point Q2, the controller controls the fan to rotate with a rotation speed which rises in accordance with a variation rate of one percent per second. In an embodiment, a threshold value corresponding to the threshold point Q2 is in the range of 50~55° C.

Still in the step S330, when the obtained temperature of the processor is greater than a threshold value corresponding to the threshold point Q4 or any threshold point on the function segments L2~L4, the controller controls the fan to rotate with a rotation speed value which rises in accordance with a maximum variation rate. In an embodiment, the maximum variation rate is greater than the variation rate of 1% per second. In an embodiment, the maximum variation rate is in positive correlation to the rising speed of the temperature of the processor. Moreover, the threshold values mentioned above can be adjusted based on actual requirements.

Still in the step S330, when the obtained temperature of the processor is greater than a threshold value corresponding to the threshold point Q5, the controller controls the fan to rotate at a maximum rotation speed value corresponding to the threshold point Q5 where the function segment L4 joins the second steady-state function segment L5. The maximum rotation speed value is a limitation at which the fan can rotate. In an embodiment, the threshold value corresponding to the threshold point Q5 is in the range of 90~95° C.

In an embodiment, the slopes of the function segments L2~L4 are set as follows:

$$Y1=P1-25,$$

$$Y2=2 \times P2-90, \text{ and}$$

$$Y3=4 \times P3-260;$$

wherein, Y1 represents a rotation speed value corresponding to the slope of the function segment L2, Y2 represents a rotation speed value corresponding to the slope of the function segment L3, Y3 represents a rotation speed value corresponding to the slope of the function segment L4, P1 represents a temperature of the processor corresponding to the slope of the function segment L2, P2 represents a temperature of the processor corresponding to the slope of the function segment L3, and P3 represents a temperature of the processor corresponding to the slope of the function segment L4.

The slope of the function segment L2 is designed according to a first noise range, the slope of the function segment L3 is designed according to a second noise range, and the slope of the function segment L4 is designed according to a third noise range. The first noise range contains noise values in the range of 23 dB to 28 dB, the second noise range contains noise values in the range of 28 dB to 39 dB, and the third noise range contains noise values greater than 39 dB.

According to the present disclosure, a multistage function curve is designed based on relations among temperatures of the processor, noise values and rotation speed values of the fan to maintain a noise value produced by the fan at a range that people can endure and feel comfortable. Furthermore, based on the multistage function curve, the disclosure controls the rising speed of the rotation speed of the fan to further decrease the instant noise variation amount, whereby reducing users' uncomfortableness to noise.

The disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for dynamically controlling a fan to dissipate heat of a processor and adjusting fan noise, the method comprising:
   predefining a multistage function curve which is established based on fan noise values and associates temperatures with rotation speed values;
   detecting a temperature of the processor;
   obtaining one of the rotation speed values by looking up the multistage function curve according to the detected temperature of the processor; and
   adjusting a rotation speed based on the obtained rotation speed value, wherein when the detected temperature of the processor is higher than a first threshold value and lower than a second threshold value, the rotation speed is controlled to rise with a variation rate of 1% per second;
   wherein the multistage function curve comprises a first steady-state function segment, a second steady-state function segment and N function segments, the N function segments are positioned between the first steady-state function segment and the second steady-state function segment, and N is a positive integer;
   a slope of the first steady-state function segment and a slope of the second steady-state function segment are both zero;
   a slope of a $(i+1)_{th}$ function segment is greater than a slope of an $i_{th}$ function segment, and i is a positive integer in a range from 1 to N;
   the $(i+1)_{th}$ function segment is linked to the $i_{th}$ function segment, and the $(i+1)_{th}$ function segment is closer to the second steady-state function segment than the $i_{th}$ function segment; and
   the first threshold value corresponds to a first threshold point where the first steady-state function segment joins a first function segment.

2. The method according to claim 1, wherein the first threshold value is in a range of 50~55° C.

3. The method according to claim 1, further comprising:
   controlling the rotation speed to rise with a maximum variation rate greater than the variation rate of 1% per second when the detected temperature of the processor is higher than the second threshold value and lower than a third threshold value, wherein the second threshold value corresponds to a second threshold point where the $i_{th}$ function segment joins the $(i+1)_{th}$ function segment.

4. The method according to claim 3, wherein the second threshold value corresponds to a second threshold point where a $(N-1)_{th}$ function segment joins a $N_{th}$ function segment.

5. The method according to claim 3, further comprising:
   when the detected temperature of the processor is higher than the third threshold value, controlling the fan to rotate at a maximum speed value, wherein the third threshold value corresponds to a third threshold point where a $N_{th}$ function segment joins the second steady-state function segment.

6. The method according to claim 5, wherein the third threshold value is in a range of 90~95° C.

7. The method according to claim 1, wherein N is equal to 3, and a first slope of a first function segment, a second slope of a second function segment and a third slope of a third function segment comply with the following relations:

$$Y1 = P1 - 25;$$

$$Y2 = 2 \times P2 - 90; \text{ and}$$

$$Y3 = 4 \times P3 - 260;$$

wherein Y1 represents a rotation speed value corresponding to the first slope, Y2 represents a rotation speed value corresponding to the second slope, Y3 represents a rotation speed value corresponding to the third slope, P1 represents a temperature corresponding to the first slope, P2 represents a temperature corresponding to the second slope, and P3 represents a temperature corresponding to the third slope.

8. The method according to claim 7, wherein the first slope is defined according to a first noise range, the second slope is defined according to a second noise range, and the third slope is defined according to a third noise range.

9. The method according to claim 8, wherein the first noise range contains noise values in a range from 23 dB to 28 dB, the second noise range contains noise values in a range from 28 dB to 39 dB, and the third noise range contains noise values greater than 39 dB.

10. A circuit for dynamically controlling a fan to dissipate heat of a processor and adjusting fan noise, comprising:
    a temperature detection means for detecting a temperature of the processor;
    a controller for obtaining one of rotation speed values by looking up a multistage function curve based on the detected temperature of the processor, and calibrating a rotation speed of the fan according to the obtained rotation speed value; and
    a south bridge chip (SBC) connected to the processor and the controller, for obtaining the detected temperature of the processor based on the temperature detection means and conveying a signal concerning the detected temperature to the controller;
    wherein the multistage function curve is established based on fan noise values, associates temperatures with the rotation speed values and comprises a first steady-state function segment, a second steady-state function segment and N function segments, the N function segments are positioned between the first steady-state function segment and the second steady-state function segment, and N is a positive integer;

a slope of the first steady-state function segment and a slope of the second steady-state function segment are both zero;

a slope of a $(i+1)_{th}$ function segment is greater than a slope of an ith function segment, and i is a positive integer in a range from 1 to N; and the $(i+1)_{th}$ function segment is linked to the ith function segment, and the $(i+1)_{th}$ function segment is closer to the second steady-state function segment than the $i_{th}$ function segment.

11. The circuit according to claim 10, wherein the controller is connected to the temperature detection means to directly obtain the detected temperature of the processor.

12. The circuit according to claim 10, wherein the controller controls the rotation speed of the fan to rise with a variation rate of 1% per second when the detected temperature of the processor is higher than a first threshold value and lower than a second threshold value, and the first threshold value corresponds to a first threshold point where the first steady-state function segment joins a first function segment.

13. The circuit according to claim 12, wherein the controller controls the rotation speed to rise with a maximum variation rate which is greater than the variation rate of 1% per second when the detected temperature of the processor is higher than the second threshold value, and the second threshold value is greater than the first threshold value and corresponds to a second threshold point where a $(N-1)_{th}$ function segment joins a $N_{th}$ function segment.

14. An electronic device, comprising:
a processor;
a fan for dissipating heat of a processor;
a temperature detection means for detecting a temperature of the processor;
a controller for obtaining one of rotation speed values by looking up a multistage function curve based on the detected temperature of the processor, and calibrating the rotation speed of the fan according to the obtained rotation speed value; and
a south bridge chip (SBC) connected to the processor and the controller, for obtaining the detected temperature of the processor based on the temperature detection means and conveying a signal concerning the detected temperature to the controller;

wherein the multistage function curve is established based on fan noise values, associates temperatures with the rotation speed values and comprises a first steady-state function segment, a second steady-state function segment and N function segments, the N function segments are positioned between the first steady-state function segment and the second steady-state function segment, and N is a positive integer;

a slope of the first steady-state function segment and a slope of the second steady-state function segment are both zero;

a slope of a $(i+1)_{th}$ function segment is greater than a slope of a $i_{th}$ function segment, and i is a positive integer in the range from 1 to N; and the $(i+1)_{th}$ function segment is linked to the $i_{th}$ function segment, and the $(i+1)_{th}$ function segment is closer to the second steady-state function segment than the $i_{th}$ function segment.

15. The electronic device according to claim 14, the controller is connected to the temperature detection means to directly obtain the detected temperature of the processor.

16. The electronic device according to claim 14, wherein the controller controls the rotation speed of the fan to rise with a variation rate of 1% per second when the detected temperature of the processor is higher than a first threshold value and lower than a second threshold value, and the first threshold value corresponds to a first threshold point where the first steady-state function segment joins a first function segment.

17. The electronic device according to claim 16, wherein the controller controls the rotation speed of the fan to rise with a maximum variation rate greater than the variation rate of 1% per second when the detected temperature of the processor is higher than the second threshold value, and the second threshold value is greater than the first threshold value and corresponds to a second threshold point where a $(N-1)_{th}$ function segment joins a $N_{th}$ function segment.

* * * * *